(12) United States Patent
Alexander et al.

(10) Patent No.: US 7,860,764 B1
(45) Date of Patent: Dec. 28, 2010

(54) METHOD AND SYSTEM FOR LEASING MOTOR VEHICLES TO CREDIT CHALLENGED CONSUMERS

(76) Inventors: Blaise Alexander, 125 Allandale Dr., Montoursville, PA (US) 17754; Joan M. Falls, 125 S. Second St., Hughesville, PA (US) 17737; Les Puglia, 9 Patriot Way, Center Ossipee, NH (US) 03814; Matthew Yeager, 916 Stoney Batter Rd., Muncy, PA (US) 17756

( * ) Notice: Subject to any disclaimer, the term of this patent is extended or adjusted under 35 U.S.C. 154(b) by 3550 days.

(21) Appl. No.: 10/002,948

(22) Filed: Oct. 18, 2001

Related U.S. Application Data

(60) Provisional application No. 60/241,601, filed on Oct. 19, 2000.

(51) Int. Cl.
*G06Q 40/00* (2006.01)
(52) U.S. Cl. .......................................... 705/35; 705/40
(58) Field of Classification Search ............. 705/38–45; 205/50–333; 210/170.08, 171
See application file for complete search history.

(56) References Cited

U.S. PATENT DOCUMENTS

| | | | | |
|---|---|---|---|---|
| 5,218,539 A | * | 6/1993 | Elphick et al. | 715/531 |
| 5,774,883 A | * | 6/1998 | Andersen et al. | 705/38 |
| 6,195,648 B1 | * | 2/2001 | Simon et al. | 705/40 |

FOREIGN PATENT DOCUMENTS

EP 762363 A1 * 3/1997

OTHER PUBLICATIONS

Robyn Meredith; Auto Dealer ahs an offer for drivers with bad credit, but there's a catch; Aug. 30, 1999; New York Times; Late Edition (East Coast); p. A. 15.*
Robyn Meredith; A Car, with a Catch When Credit is Bad; Aug. 30, 1999; New York Times; Late Edition (East Coast); p. A15.*

(Continued)

*Primary Examiner*—James P Trammell
*Assistant Examiner*—Marissa Liu
(74) *Attorney, Agent, or Firm*—McNees Wallace & Nurick LLC

(57) ABSTRACT

A system is provided for leasing motor vehicles to credit challenged consumers or consumers that do not qualify for conventional financing. The system utilizes a short term prepaid lease in combination with a device utilizing microprocessor technology installed in the motor vehicle to encourage payment. The consumer pays in advance to use the motor vehicle for a predetermined lease period. If the consumer does not make the prepayment, the device installed in the vehicle prevents the vehicle from operating. The system is used to make a determination as to the amount of a weekly payment a credit challenged consumer ("Consumer") can afford. Using the weekly payment amount, the system then extrapolates the value of a vehicle appropriate for the Consumer's payment ability. Once the lease has been executed, a predetermined operating time is loaded into the device, which is connected to the vehicle's ignition system. The device renders the ignition system inoperable upon there being no authorized operating time remaining in the device. Each week the Consumer prepays for the next week, and upon bank clearing of the payment, an additional week of preloaded operating time is authorized by entering data into the device connected to the ignition system.

8 Claims, 1 Drawing Sheet

---

Checklist

___ 1. Properly signed and dated lease contracts (original) (keep a copy in the deal).
___ 2. Legible copy of a credit bureau report.
___ 3. Required State Forms using dealer as seller and leasing company as purchaser.
___ 4. Copy of front and back of assigned title (Use lending institution as lien holder).
___ 5. Copy of a properly completed insurance policy change form listing leasing company and lending institution as loss payee and leasing company as additionally insured and also showing proper coverage for a lease (100,000/300,000/50,000). A photocopy of an insurance card and agreement to provide insurance is also required.
___ 6. Copy of completed gap insurance form (every deal must include gap).
___ 7. Copy of service contract/warranty agreement (if applicable).
___ 8. Copy of Buyer's guide (FTC sticker) form signed by buyer.
___ 9. Customer Credit Application signed by buyer(s).
___ 10. Completed leasing company in/out.
___ 11. Photocopies of: valid driver's license, social security card, and insurance card.
___ 12. Completed reference sheets (min. 7)
___ 13. Proof of income (e.g., 2 pay stubs no more than 30 days old).
___ 14. Proof of residency (e.g., phone bills, lease agreement, a utility bill, etc.)
___ 15. Copies of 3 disclaimer signed by buyer(s).
___ 16. Copies of Bill of Sale and lending institution assignment ready to be signed.
___ 17. Spare set of keys to be kept with dealership's paperwork (do not send keys with paperwork).
___ 18. Copy of leasing company worksheet/approval sheet complete with approval signature.
___ 19. Fees check made payable to leasing company (any up-front payments + acquisition fees).
___ 20. If a leased vehicle is new, then a copy of the original factory invoice must be included.

OTHER PUBLICATIONS

Farr: Critics Won't Disable Plans for Growth.
Farr: Puts Reputation on the Line to Help (Jun. 12, 1999).
Disarming the Defense (Nov. 1999).
Farr: Can Use Shutoff Switch on Lease Cars (Dec. 21, 1999).
Smart Cars Won't Start if Drivers Don't Make Payments (Dec. 13, 2000).
Used Cars Are Farr's New Focus (Jan. 15, 2000).
Auto Dealer Has An Offer for Drivers With Bad Credit (Aug. 30, 1999).

* cited by examiner

Checklist

___ 1. Properly signed and dated lease contracts (original) (keep a copy in the deal).

___ 2. Legible copy of a credit bureau report.

___ 3. Required State Forms using dealer as seller and leasing company as purchaser.

___ 4. Copy of front and back of assigned title (Use lending institution as lien holder).

___ 5. Copy of a properly completed insurance policy change form listing leasing company and lending institution as loss payee and leasing company as additionally insured and also showing proper coverage for a lease (100,000/300,000/50,000). A photocopy of an insurance card and agreement to provide insurance is also required.

___ 6. Copy of completed gap insurance form (every deal must include gap).

___ 7. Copy of service contract/warranty agreement (if applicable).

___ 8. Copy of Buyer's guide (FTC sticker) form signed by buyer.

___ 9. Customer Credit Application signed by buyer(s).

___10. Completed leasing company in/out.

___11. Photocopies of: valid driver's license, social security card, and insurance card.

___12. Completed reference sheets (min. 7)

___13. Proof of income (e.g., 2 pay stubs no more than 30 days old).

___14. Proof of residency (e.g., phone bills, lease agreement, a utility bill, etc.)

___15. Copies of 3 disclaimer signed by buyer(s).

___16. Copies of Bill of Sale and lending institution assignment ready to be signed.

___17. Spare set of keys to be kept with dealership's paperwork (do not send keys with paperwork).

___18. Copy of leasing company worksheet/approval sheet complete with approval signature.

___19. Fees check made payable to leasing company (any up-front payments + acquisition fees).

___20. If a leased vehicle is new, then a copy of the original factory invoice must be included.

FIG. 1

METHOD AND SYSTEM FOR LEASING MOTOR VEHICLES TO CREDIT CHALLENGED CONSUMERS

CROSS REFERENCE TO RELATED APPLICATIONS

This application claims the benefit of U.S. Provisional Application No. 60/241,601 filed Oct. 19, 2000.

FIELD OF THE INVENTION

This invention relates to a method and system of financing generally, and specifically to a method and system for leasing motor vehicles to credit challenged consumers.

BACKGROUND OF THE INVENTION

Personal transportation has become an essential part of modern society as people have left urban settings for suburban and rural lifestyles. No longer can income earners rely solely on public transportation to travel to the job site. Likewise, the proliferation of supermarkets and shopping centers located beyond walking distance from a residence requires the use of personal transportation to feed and clothe a household.

Personal transportation generally takes the form of a motor vehicle such as an automobile, motorcycle or light truck. The vast majority of payment arrangements for acquisition of these vehicles is through financing. The traditional method for financing the purchase price of personal transportation has been for the purchaser to negotiate a loan with a financing institution, generally a bank or credit union.

In recent years, leasing, rather than purchasing, has become popular. Leasing generally requires little or no down payment and the monthly payments are generally 30 to 40 percent less than a traditional loan of the same term. When a vehicle is purchased, the buyer pays the vehicle's full cost. However, when leased, payment is only for the portion of the vehicle's value that is used, because at the end of the lease the vehicle still has a remaining (residual) value.

Under conventional leasing methods, the lessee signs a lease agreement with the lessor in which the lessee agrees to pay a specified monthly fee for a specified period of time, generally two to five years, in exchange for the use of the vehicle over that specified period of time. The monthly fee is based primarily on the vehicle's anticipated depreciation over the term of lease plus interest and service charges.

Conventional leasing methods include a Closed End (Walk Away) lease and an Open End (Finance) lease. In the Closed End lease, the lessee is not responsible for any depreciation risk at the end of the lease. There is an opportunity for the lessee to purchase the vehicle at the end of the lease for the fair market value, however, there is no obligation to do so. In the Closed End lease, the lessee is only responsible for abnormal wear and/or excessive mileage on the vehicle, if any.

In the Open End lease, a predetermined price is set at the start of the lease for which the lessee may buy the vehicle at lease end. However, if the lessee decides not to purchase the vehicle at the end of the lease, the lessee is responsible for the residual value when the lease period is over. Should the vehicle be worth more than the anticipated residual value, the lessee receives the difference.

Despite the demonstrated need for a motor vehicle in modern society, more than sixty percent of all potential purchasers/lessees visiting dealerships do not qualify for conventional financing due to a variety of different factors, including a poor credit history, no credit history and/or a perceived inability to make payments. Thus, there is an ongoing need for improved methods and systems that permit credit challenged consumers, i.e. consumers that do not qualify for conventional financing, to obtain personal transportation, while maintaining the risk position of a lessor at an acceptable level. The present invention fulfills this need, and further provides related advantages.

SUMMARY OF THE INVENTION

The present invention provides a novel method and system for leasing motor vehicles to credit challenged consumers or consumers that do not qualify for conventional financing, utilizing a short term prepaid lease in combination with a device utilizing microprocessor technology installed in the motor vehicle to encourage payment. The consumer pays in advance to use the motor vehicle for a predetermined lease period. If the consumer does not make the prepayment, the device installed in the vehicle will prevent the vehicle from operating during the upcoming lease period.

The present invention is used to make a determination as to the amount of a weekly payment a credit challenged consumer ("Consumer") can afford. Using the weekly payment amount, the present invention is then used to extrapolate the value of a vehicle appropriate for the Consumer's payment ability and a weekly lease is negotiated. Once the lease has been executed, a predetermined operating time is loaded into a device, for example, a device utilizing microprocessor based technology, connected to the vehicle's ignition system. The device renders the ignition system inoperable upon there being no authorized operating time remaining in the device. Each week the Consumer prepays for the next week, and upon bank clearing of the payment, an additional week of preloaded operating time is authorized by entering data into the device connected to the ignition system.

An advantage of the present invention is that by utilizing a short term pre-paid lease combined with the ability to make the vehicle non-operational, the credit challenged consumer is motivated to continue making payments.

Another advantage of the present invention is that the risk to the leasing company is reduced to an acceptable level, thereby allowing leases to be offered to a heretofore non-reached market share, with a resultant increase in business and profits.

Other features and advantages of the present invention will be apparent from the following more detailed description of the preferred embodiment, which illustrates, by way of example, the principles of the invention.

BRIEF DESCRIPTION OF THE DRAWINGS

FIG. 1 illustrates a checklist to be used for submitting a Consumer application to a Reviewer.

DETAILED DESCRIPTION OF THE PREFERRED EMBODIMENTS

The present invention sets forth a novel method and system for assisting in the leasing of motor vehicles to credit challenged consumers. The leasing of motor vehicles according to the present invention is generally accomplished through a leasing company or other similar entity. While the leasing company is generally owned by a third party, optionally, in one embodiment, the owner of a vehicle dealership may establish a separate leasing company to provide leasing services to his own dealership.

In a preferred embodiment, the leasing system of the present invention provides assistance to the leasing company in acquiring a revolving line of credit from a lending institution, for example, a commercial bank. The leasing system can determine the dollar amount for the revolving line of credit that the leasing company is to obtain from the lending institution. The leasing system can also provide information on lines of credit and can provide assistance in completing an application. In one embodiment of the present invention, the leasing system can include an electronic line of credit application that can be completed and sent to a lending institution. In a preferred embodiment, the dollar amount for the line of credit is determined to be equal to the amount of business anticipated during a predetermined period, for example, two years and is represented by the formula:

line of credit=deals per month*months in period*average deal value($).

For example, a leasing company completing 10 deals per month for a one year period (12 months) with an average deal value of $5000.00 would need a line of credit of $600,000 (10*12*5000) for the one year period. However, other criterion and other formulas for determining the dollar amount for the revolving line of credit can also be used.

In addition, the leasing system can provide assistance to the leasing company in determining an approximate interest rate to be paid on the revolving line of credit. The leasing system can utilize financial information of the borrower and apply the information to an interest rate methodology used by a financial institution to determine the approximate interest rate. For example, the leasing system can determine that the line of credit should be secured at favorable interest rate that is directly related to the prime interest rate. The determined approximate interest rate can be the prime rate, a half-point under the prime rate, or a half-point over the prime rate, depending on the strength of the leasing company and the interest rate methodology used. As noted above, when the dealership establishes a leasing company the borrower is, in essence, the dealership, hence, in this situation, it is the financial strength of the dealership that will help to determine the interest rate.

Following acquisition of the line of credit, the leasing system assists the leasing company in obtaining appropriate insurance coverage. The leasing system can assist the leasing company in the acquisition of insurance to protect against improper installation, sales, or service of add on vehicle items or devices. Additionally, the leasing system can assist the leasing company in adding to their general garage keeper policy a rider for contingent (excess) liability. The leasing system can also assist the leasing company in obtaining other kinds of insurance that are necessary or required for the leasing of motor vehicles. The leasing system can provide information on the types of insurance that are available and on those types that may be required.

In one embodiment of the present invention, the leasing system can include an electronic insurance application that can be completed and sent to an insurance company.

After the leasing company has acquired a line of credit and the appropriate insurance coverage, the leasing system can assist the leasing company in appointing a representative to do the approving, funding, and posting of a lease (the "Reviewer"). In one embodiment, the leasing system can provide evaluation guidelines pertaining to the Reviewer of the leasing company, recommending that the Reviewer possess computer skills, basic accounting skills and have some finance and insurance (F & I) experience. However, other types of guidelines can also be used in evaluating a possible Reviewer. Optionally, the Reviewer may be employed by both the leasing company and the dealership.

The leasing system then provides assistance to the leasing company in selecting the right vehicle for the Consumer's individual situation. The leasing system provides the leasing company with recommendation guidelines that assist the leasing company in determining the vehicle of choice that satisfies the Consumer's needs based upon the dollar amount per week lease payment the Consumer can afford. In one embodiment, the recommendation guidelines can result in a mid-priced, low maintenance, functional vehicle being selected as the vehicle of choice for the Consumer. However, the recommendation guidelines can be modified for other types of vehicles to be selected. An example of the guidelines, assistance and calculations the leasing system can provide the leasing company are as follows:

Eligible Model Years:
36 month term=current model year to 5 model years old
24 month term=6-8 model years old
12 month term=9 & 10 model years old
The leasing system can have a guideline that, for example no vehicle will qualify if it is greater than 10 model years old Mileage/Term Requirements:
Under 60,000 miles=maximum 36 months (156 weeks)
60,000-100,000 miles=maximum 24 month (104 weeks)
100,000-130,000=maximum 12 months (52 weeks)
The leasing system can have a guideline that, for example, 18 and 30 month terms will be considered for marginal vehicles and mileage.

Capitalized Cost:
The leasing system can provide assistance in determining the net capitalized cost. For example, the maximum net capitalized cost of a lease can be set to be no more than 120% of current NADA retail value. The leasing system can further have a guideline that, for example, no vehicle may be considered for the program with a net cap cost of more than $13,000.00.

Vehicles of Choice:
The leasing system preferably has guidelines that any vehicle with a history of good reliability and that can be obtained for a reasonable price is suited for the program. For example, a Cavalier, Prism, Escort, Lumina, Malibu, Taurus, Corolla, Saturn, S-10 Ranger truck, Venture, and Windstar minivans, most full size pick-ups, and Jeep Cherokee can be used for the program.

Vehicles Excluded from the Program:
The leasing system can also have guidelines that vehicles with mechanical problems, with pre-existing damage or known problems or with poor or undetermined reliability should be excluded from the program. For example, late model automobiles with demonstrated head gasket and transmission problems, kit cars, modified or lifted trucks, and any vehicle with a branded title, i.e., "R", Flood, etc. will preferably be excluded from the program.

Residual Value Calculation:
The leasing system can provide assistance in determining the approximate residual value of the vehicle to be leased by subtracting the number of years of the lease from the year of the vehicle being leased. Recording the current trade-in value for the vehicle using, for example, a current edition NADA guide. Then taking the current mileage of the vehicle being leased and adding 20,000 miles for each year of the lease to obtain an adjusted mileage for the vehicle. If there is a deduction for the adjusted mileage, then the trade-in value for the vehicle is reduced by that amount. Finally, the adjusted trade-in value is multiplied by 60% to determine the approximate residual value. Residual values may be adjusted, for example, 5% either way, but not without proper justification and approval. Currently, IRS regulation M states: A residual can never be less than 10% of the gross capitalized cost.

For example, to determine the residual value on a 1998 Cavalier 4-Door Sedan with 35,000 miles for a 3-year lease, the first step would be to subtract the lease term (3 years) from the model year (1998) of the vehicle to be leased, (1998−3=1995). Next, the trade-in value of a 1995 Cavalier 4-Door Sedan is determined ($3225). The existing mileage (35,000) is added to the mileage adjustment for the 3 year term (20000*3=60000) to obtain the adjusted mileage (95000) to use in determining the trade-in value. If there is an adjustment for the adjusted mileage (−$500), this is accounted for in the adjusted trade-in value ($2675). Finally, multiply the adjusted trade-in value by 60% ($2675*0.6) to obtain the residual value ($1605).

Money Factors:

The leasing system can provide assistance in determining a money factor to be used. For example, in one embodiment, an approximate 0.00875 money factor (equivalent to approx. 19.8%) can be used. A moderate lease factor, for example, a factor that equates to a percentage less that the maximum percentage rate allowed by law, is used to not take advantage of the customer and help avoid the scrutiny normally associated with sub-prime financing. Also, because the default rate associated with the present invention is exceptionally low, this money factor affords ample reserves. Ideally, the ratio of the borrowing interest rate (what the leasing company pays) to the lending interest rate (what the customer pays) should be approximately 1:2. However, other ratios between the borrowing interest rate and the lending interest rate can be used.

The leasing system of the present invention also provides the leasing company assistance in determining a Consumer best suited for receiving a lease of this type. The leasing system can assist the leasing company in evaluating, for example, the Consumer's weekly income, job history, and residential stability for eligibility for a lease. The leasing system also assists the leasing company in determining the Consumer's available amount of cash and/or trade equity and the amount of equity that is required to complete the lease transaction. In one embodiment, the available amount requirement may be tailored to each Consumer, however, this amount should preferably be an amount great enough to cover, for example, all lease acquisition fees and the Consumer's first two weekly payments.

After a salesperson from the dealership and the Consumer have completed vehicle model and pricing negotiations, the leasing system assists the salesperson or optionally, a special finance manager, in completing and forwarding, preferably in an electronic format, the required forms and information to the Reviewer for lease approval. The leasing system can provide the salesperson with a checklist, such as the one in FIG. 1, to assist the salesperson in ensuring that the required forms and information are transferred to the Reviewer.

In one embodiment of the present invention, the leasing system includes electronic versions of the forms that are included on the checklist and an electronic checklist. The salesperson can then enter the information into the electronic forms and checklist and after all the required information has been entered, the salesperson can transfer the information electronically, e.g. by facsimile, e-mail or by modem, to the Reviewer. After review of the transferred information by the Reviewer, or other designated leasing company representative, an approval worksheet is completed with the assistance of the leasing system and is returned electronically, e.g., by facsimile, e-mail or computer modem, to the salesperson or special finance manager. The approval worksheet is then used in giving an approval, an approval with qualifications, a requests for further information, or a denial of the lease.

Upon approval of the lease and in accordance with the leasing system, the salesperson or special finance manager delivers the vehicle to the Consumer in return for the required paperwork, insurance information and cash down payment or trade-in (the "deal package"). The deal package is taken to an office, for example, the dealership business office, where the Consumer's check and/or cash is deposited and the deal is booked. The business office then issues a check to the leasing company for the acquisition fees and the Consumer's first two weekly payments. These items, along with the leasing company packet including the aforementioned items, are forwarded to the Reviewer for funding.

The Reviewer reviews the packet to insure all information is correct and complete, and if so, the leasing system assists the leasing company in submitting an authorization to the lending institution with appropriate documents. The appropriate documents submitted to the lending institution include, for example, the lease agreement, a copy of the automobile title displaying the lending institution as the lien holder, and any other forms or information as required by the lending institution. Upon receipt of the authorization, the lending institution funds the vehicle sales contract by depositing the net cap cost, defined as the total sales price less cash down or trade equity, into the leasing company's account.

The leasing system then provides the leasing company assistance in transferring money to the vehicle dealership. The leasing company can, for example, issue a check to the dealership, or alternatively, if the leasing company and the dealership are owned by the same principal, a bank account jointly accessible by both the leasing company and the dealership may be utilized, in which case the physical transfer of funds is not necessary.

The information on each lease is tracked by the leasing company using the leasing system, for example, by utilizing a computer. The leasing system also helps the leasing company generate any required schedules associated with the lease. The generated schedules can include, for example, schedules for state sales taxes, income statements, depreciation schedules, payoff schedules, credit reports and amortization tables. Alternatively, the leasing system can be used to transfer the lease information to a third party who, for a fee, will track the lease and issue required schedules to the leasing company.

An integral part of the leasing system of the present invention is the ability to motivate the Consumer to make the prepayment for the period of upcoming use of the motor vehicle. The leasing system assists the leasing company and/or the dealer in selecting and installing to manufacture's instructions a device which, in the motor vehicle, engages to prevent operation of the motor vehicle unless the lease payment is made in advance for the upcoming operational period. The leasing system can provide information on the different types of disabling devices that are available.

One way to achieve this prepayment from the Consumer is to add a device with a microprocessor to the vehicle's ignition system that prevents starting the vehicle without a proper authorization that is contingent upon prepayment by the Consumer. Upon receipt of the prepayment from the Consumer, the leasing system arranges for authorization or data to be transferred to the device in the vehicle to enable the vehicle to be operated for the upcoming operational period.

In one embodiment, the authorization or data transferred to the device is an authorization code, which is entered into the microprocessor, although other techniques for transferring authorization or data to a device can be used. The authorization code can be entered into the microprocessor by way of an accessible keypad associated with the device, e.g. a keypad mounted to the dashboard of the vehicle or the authorization code can be transferred to the device and entered into the microprocessor from a distance via electromagnetic radiation or waves such as radio waves or a cell phone. The entry of the data or authorization into the microprocessor deactivates the device in the vehicle that disables the vehicle, thereby permitting operation of the vehicle for the prepaid operational period.

Upon delivery of the vehicle to the Consumer, a plurality of predetermined authorization codes are entered by a representative of the leasing company, for example, the salesperson or special finance manager, which will permit the vehicle to operate for the prepaid period of the lease. This plurality of authorization codes equals, for example, a separate code for each payment period, plus a predetermined number of codes for emergency use. Additionally, a reset code, unique to each microprocessor is entered. As each payment for the upcoming lease period clears the bank, the leasing company provides the authorization code that has been pre-loaded into the microprocessor as described above. The subsequent entry of this pre-loaded code permits continued operation of the vehicle for the next prepaid lease period.

Because a predetermined number of codes are preloaded into the microprocessor, the leasing system allows the customer to prepay for more than one period and have the predetermined authorization codes for those pre-paid periods entered into the microprocessor at one time. In this manner, the customer will not have to be bothered with entering authorization codes as each time period expires if the next time period has already been paid.

These periods may be of any duration, however, for the credit challenged consumer, shorter periods such as, for example, weekly, bi-weekly or monthly periods are more affordable. In this manner, the credit challenged consumer is motivated to make the lease payment to avoid having an inoperable vehicle.

Should a payment period be missed and the vehicle disabled, entry of a predetermined emergency code will allow the vehicle to be operated for a predetermined period of short duration, in response to emergencies. If all of the pre-loaded emergency codes have been used, entry of the unique reset code will reset the emergency codes for additional use. This is particularly important when, for example, the vehicle needs to be repossessed, thereby allowing activation of the repossessed vehicle, permitting it to be driven away, rather than having to tow or transport the vehicle.

Optionally, additional technology can be an installed, for example, Global Positional Systems and Radio Frequency Identification, useful in assisting the leasing company and/or the dealership in tracking and recovering the vehicle in the event that the Consumer discontinues making payments and the vehicle becomes disabled.

In one embodiment of the present invention, the functions and assistance of the leasing system are integrated into a computer program executable by a general purpose computer. The use of the computer program permits rapid and accurate calculation of values, easy and quick access to required reference information, an easier way for filling out required forms and simpler and faster communications with other computers, as required by the leasing system. The computer program can be accompanied by a reference manual that provides additional information that is not part of the computer program, but may be needed for use in the leasing system. The computer program can be used as a guide a person through the set-up of a leasing company to the completion and of a lease with the Consumer.

Although the present invention has been described in connection with specific examples and embodiments, those skilled in the art will recognize that the present invention is capable of other variations and modifications within its scope. For example, while an automobile lease has been used as an exemplar, it should be appreciated that all items having the capability to be programmably disabled, for example, commercial vehicles such as trucks, farm vehicles and construction vehicles, as well as motorcycles, boats, airplanes and electronic items are suited to the system and method of the present invention. These examples and embodiments are intended as typical of, rather than in any way limiting on, the scope of the present invention as presented in the appended claims.

What is claimed is:

1. A system for leasing a motor vehicle to a credit challenged consumer comprising:
    a device configured to render the vehicle operable for a predetermined period of time, the vehicle otherwise being inoperable with the installed device;
    means for obtaining a funded lease for the vehicle, the means for obtaining being configured to compute at least one predetermined financial parameter in electronic form based on at least one financial parameter associated with the consumer; and
    a means for activating the device upon payment of a predetermined lease amount;
    wherein the means for obtaining comprises a microprocessor and the at least one predetermined financial parameter in electronic form is selected from the group consisting of a dollar amount for a revolving line of credit obtained by a leasing company from a lending institution to fund the lease; an interest rate to be paid on the revolving line of credit; insurance coverage appropriate for the funded lease; a vehicle appropriate for a consumer; a lease reviewer for approving, funding and posting the lease; a consumer appropriate for the funded lease; at least one predetermined form and information used by the reviewer; predetermined information used by a vehicle dealership; predetermined information used by the leasing company, predetermined information used by a third party, and combinations thereof, and the at least one predetermined financial parameter is selected from the group consisting of a consumer's weekly income, job history, residential stability, available amount of cash, available trade equity and an amount of equity required to complete a lease transaction.

2. The system of claim 1 wherein the funded lease is funded by a leasing company and the means for obtaining a funded lease comprises means for calculating a revolving line of credit substantially equal to an amount of business anticipated during a predetermined period for the leasing company, using the formula:

number of deals per month×number of months×average deal value($).

3. The system of claim 1 wherein the device is configured to render the vehicle operable for a predetermined period of time comprises a device with a microprocessor connected to the vehicle's ignition system to prevent starting of the vehicle without a predetermined authorization.

4. The system of claim 3 wherein the means for activating the device comprises:

the microprocessor configured to, upon delivery of the vehicle to the customer, receive a plurality of predetermined authorization codes, each of the codes upon activation rendering the vehicle operable for the predetermined period;

wherein one authorization code of the plurality of predetermined authorization codes being supplied to the customer for a paid predetermined period; the authorization code for the paid predetermined period, rendering the vehicle operable for the predetermined period when entered into the microprocessor.

5. The system of claim 4 wherein the predetermined period is selected from the group consisting of weekly, bi-weekly and monthly.

6. The system of claim 4 wherein the plurality of predetermined authorization codes includes an emergency code for allowing the vehicle to be operated for a period of predetermined short duration in response to an emergency and a reset code for resetting a previously activated emergency code.

7. The system of claim 1 further comprise a device for tracking the vehicle selected from the group consisting of a Global Positional System device and a Radio Frequency Identification device.

8. The system of claim 1 wherein the means for activating the device includes transferring an authorization code selected from the group consisting of using a keypad, via radio waves and via a cellular telephone.

* * * * *

UNITED STATES PATENT AND TRADEMARK OFFICE
CERTIFICATE OF CORRECTION

| | |
|---|---|
| PATENT NO. | : 7,860,764 B1 |
| APPLICATION NO. | : 10/002948 |
| DATED | : December 28, 2010 |
| INVENTOR(S) | : Alexander et al. |

It is certified that error appears in the above-identified patent and that said Letters Patent is hereby corrected as shown below:

Column 6, line 3, "requests for further..." should read --request for further...--

Column 6, line 51, "...installing to manufacture's" should read --...installing to manufacturer's--

Signed and Sealed this
Seventeenth Day of July, 2012

David J. Kappos
*Director of the United States Patent and Trademark Office*